Dec. 2, 1969  G. E. LAUCKNER  3,481,571
STABILIZER FOR PLUMBING PIPES
Filed July 19, 1967

INVENTOR.
GEORGE E. LAUCKNER
BY
*Learman + McCulloch*

United States Patent Office 3,481,571
Patented Dec. 2, 1969

3,481,571
STABILIZER FOR PLUMBING PIPES
George E. Lauckner, 1490 Seminole Lane,
Saginaw, Mich. 48603
Filed July 19, 1967, Ser. No. 654,467
Int. Cl. F16l 5/00
U.S. Cl. 248—57     3 Claims

ABSTRACT OF THE DISCLOSURE

A channel shaped stabilizer member spanning a gap formed in a structural member and having an opening in which a plumbing pipe snugly is accommodated, the opening being surrounded by an upset lip. Interposed between the lip and the pipe is a split ring formed of resilient material.

---

The invention relates to a stabilizer for a plumbing pipe or the like and which is adapted to support the pipe in a gap formed in a header or other structural member and to rigidify the header member. Apparatus constructed in accordance with the invention is especially adapted for use in dwellings and other frame buildings wherein plumbing vent pipes pass through openings formed in the structural parts of the building.

In the construction of a dwelling or other frame building, it is conventional practice to form a wall from vertical 2" x 4" studs, the upper ends of which are joined by a horizontal header member which usually is formed of two or three 2" x 4" boards nailed to one another and to the studs. Such walls conventionally are formed without making any provision for the passage of pipes by means of which the plumbing system is ventilated. However, it is preferable that the vent pipes be enclosed within the wall so as to avoid exposed plumbing and to avoid unsightly projections. Accordingly, it is conventional practice for a plumber to bore or drill through the header member to provide an opening for the accommodation of such a pipe. The drilling of the header members is a difficult and frequently dangerous task inasmuch as a rather large diameter drill must be supported in upright or vertical position above the head of the operator. It is not uncommon for the driller to drill an opening which is axially nonvertical, nor is it uncommon for the opening to be off center with respect to the header. If the opening is non-vertical, the vent pipe to be accommodated therein cannot be vertical, thereby resulting in alignment problems. If the opening in the header is off center, it is not uncommon for the header member to be cut away entirely, thereby greatly weakening the header.

An object of this invention is to provide a stabilizing member for plumbing pipes or the like and which overcomes the disadvantages referred to above.

Another object of the invention is to provide a stabilizing member which makes it possible to cut completely through a header member and yet provides a stable support for the vent pipe and rigidifies the header member.

A further object of the invention is to provide a stabilizer of the character referred to and which is capable of providing at least a partial seal around the pipe so as to minimize drafts and fire hazards.

Another object of the invention is to provide a stabilizer of the kind described and which is economical to manufacture and easy to use.

Other objects and advantages of the invention will be pointed out specifically or will become apparent from the following description when it is considered in conjunction with the appended claims and the accompanying drawings, in which:

Figure 1:
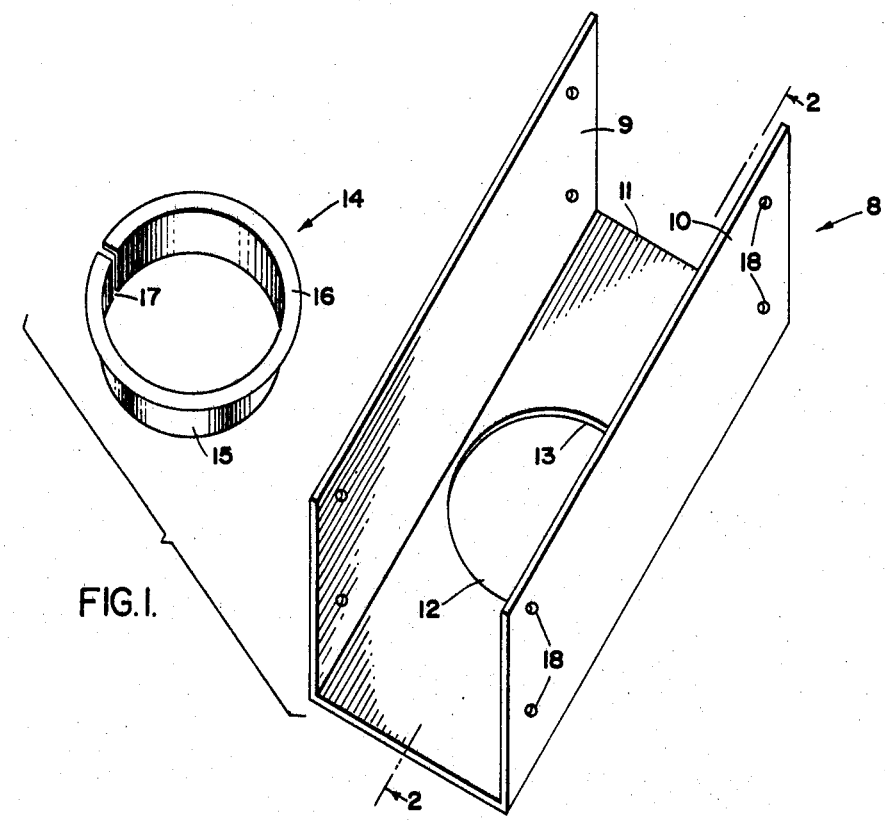
FIGURE 1 is an exloped, isometric view of apparatus constructed in accordance with the invention.
Figures 2, 3:
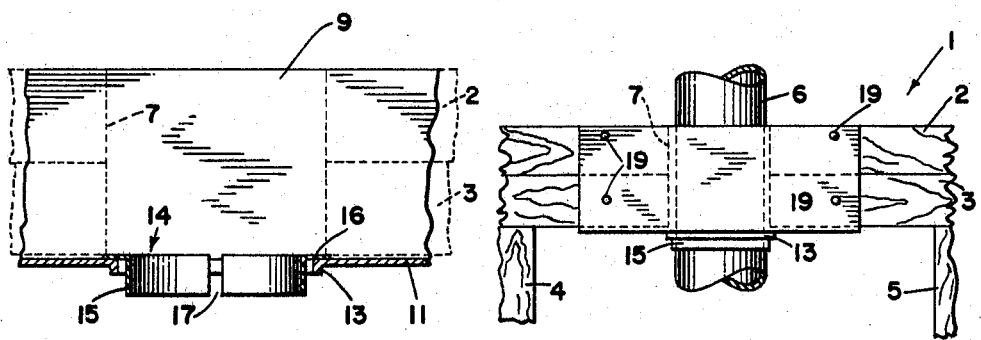
FIGURE 2 is a longitudinal sectional view taken on the line 2—2 of FIGURE 1 and illustrating the header member in dotted lines.
FIGURE 3 is a fragmentary, side elevational view illustrating the apparatus in assembled relation with a header member and a vent pipe.

Apparatus constructed in accordance with the invention is adapted for use in conjunction with a horizontal header member 1 composed of two 2" x 4" boards 2 and 3 that are nailed to one another and secured at the upper ends of vertical studs 4 and 5. The spacing between adjacent studs conventionally is 16 inches between centers and it is customary to install a plumbing vent pipe 6 between two adjacent studs. According to the present invention, the header member 1 is cut between two adjacent studs to provide a gap 7 of greater size than the diameter of the pipe 6 so as to facilitate positioning of the pipe 6 in the gap and in a truly vertical position.

A stabilizing member 8 preferably formed of metal is provided for maintaining the pipe 6 in proper position in the gap 7. The member 8 is channel or U-shaped and has substantially parallel side walls 9 and 10 joined together by a horizontal web 11. The height of the side walls corresponds substantially to the vertical thickness of the header. Substantially midway between its ends the web 11 is provided with an opening 12 having a shape corresponding to the shape of the pipe 6 and having a diameter slightly in excess of the diameter of the pipe 6 so as to facilitate assembly of the pipe and the member 8. The web 11 preferably is upset adjacent the opening 12 so as to provide an annular lip 13 which surrounds the opening and projects downwardly from the web 11. The lip 13 rigidifies the web 11 and assists in guiding the member 8 onto the pipe 6.

The apparatus also preferably includes a seal member 14 comprising a cylindrical sleeve 15 terminating at its upper end in a peripheral flange 16. The sleeve 15 has a diameter less than that of the opening 12 and has a thickness corresponding substantially to the difference between the diameters of the pipe 6 and the opening 12 so as substantially to occupy the space between the pipe and the lip 13 and minimize the flow of air therethrough. The member 14 preferably is split as at 17 and is formed of a flexible material such as polyethylene or the like so as to facilitate its assembly with the other apparatus.

Each side wall 9 and 10 preferably is provided adjacent opposite ends thereof with a plurality of openings 18 so as to accommodate nails 19 or other securing members by means of which the member 8 may be anchored in embracing relation with the header member 1.

In the use of the apparatus, the header member 1 may be cut with a saw to provide the gap 7. The assembled members 8 and 14 then may be threaded onto the pipe 6 and the latter positioned vertically within the gap 7. The member 8 then may be slid upwardly along the pipe 6 until the side walls 9 and 10 parallel the corresponding sides of the header 1 and the web 11 engages the bottom surface of the header. The nails 19 then may be driven into the header members 2 and 3 to anchor the member 8 to the member 1 with the gap 7 spanned by the member 8. In these positions of the parts, the header member 1 is at least as rigid as it was prior to the cutting gap 7, the pipe 6 is maintained snugly in vertical position, and the seal member 14 substantially blocks the flow of air past the header 1, thereby reducing drafts and minimizing fire risks. The seal also prevents metal to metal engagement and prevents electrolysis.

The use of the apparatus disclosed herein avoids the necessity of having to drill the header members and, consequently, avoids the inherent danger in the use of such a drill. Moreover, the cutting of the gap 7 by means of a saw is much faster and less tiring than utilizing a drill. Furthermore, the member 8 rigidifies the header 1 and provides a more stable support for the pipe 6.

Another advantage of the disclosed construction is that the metal side walls 9 and 10 protect the pipe 6 against damage by careless lathers. That is, the walls 8 and 9, being formed of metal, make it impossible for a lather to drive lathing nails into the pipe 6.

The disclosed embodiment is representative of a presently preferred form of the invention, but is intended to be illustrative rather than definitive thereof. The invention is defined in the claims.

I claim:
1. Apparatus for use in stabilizing a cylindrical pipe in a gap between spaced apart structural members, said apparatus comprising a channel member unobstructed from end to end and of such length as to span said gap and extend beyond both ends thereof, said channel member having a pair of parallel planar sides joined by a web normal to each of said sides, said web having a flat surface, said sides being spaced apart a distance to enable them snugly to embrace opposite sides of said structural members, said web having a circular opening therein between the ends of said channel member and of greater diameter than that of said pipe, a split ring formed of resilient material, said ring having a tubular portion of smaller diameter than that of said opening accommodated in said opening, said tubular portion terminating at one end in a peripheral flange of greater diameter than that of said opening and seated on said flat surface of said web, and means for securing said channel member to each of said structural members.

2. The apparatus set forth in claim 1 wherein the edge of said web adjacent said opening is upset to form an annular lip extending normal to said web in a direction away from said flat surface.

3. The apparatus set forth in claim 1 wherein said ring is formed of material different from that forming said channel member.

References Cited

UNITED STATES PATENTS

| | | | |
|---|---|---|---|
| 364,042 | 5/1887 | Richardson | 287—189.36 |
| 1,657,243 | 1/1928 | Daniels. | |
| 2,219,327 | 10/1940 | Miller | 248—56 X |
| 2,901,270 | 8/1959 | Baker | 285—42 X |
| 3,338,600 | 8/1967 | Wahl | 285—158 X |
| 704,884 | 7/1902 | Lally | 287—20.925 |

FOREIGN PATENTS 948,306    6/1947    France.

EDWARD C. ALLEN, Primary Examiner